United States Patent

Sharma et al.

[11] Patent Number: 6,042,964
[45] Date of Patent: Mar. 28, 2000

[54] THERMALLY REGENERATIVE BATTERY WITH INTERCALATABLE ELECTRODES AND SELECTIVE HEATING MEANS

[75] Inventors: Pramod K. Sharma, La Canada; Sekharipuram R. Narayanan; Gregory S. Hickey, both of Altadena, all of Calif.

[73] Assignee: The United States of America as represented by the Administrator of the National Aeronautics and Space Administration, Washington, D.C.

[21] Appl. No.: 09/035,408

[22] Filed: Feb. 20, 1998

[51] Int. Cl.$^7$ ................................................. H01M 10/50
[52] U.S. Cl. ...................... 429/112; 429/49; 429/231.4; 429/231.8
[58] Field of Search ............................ 429/231.4, 231.7, 429/231.8, 112, 188, 120, 49; 136/200

[56] References Cited

U.S. PATENT DOCUMENTS

| | | | |
|---|---|---|---|
| H1076 | 7/1992 | Siane et al. | 429/194 |
| 4,294,898 | 10/1981 | Hartstein | 429/104 |
| 4,315,059 | 2/1982 | Raistrick et al. | 429/112 |
| 4,707,423 | 11/1987 | Kalnin et al. | 429/112 |
| 4,861,690 | 8/1989 | Ope et al. | 429/233 |
| 4,863,818 | 9/1989 | Yoshimoto et al. | 429/218 |
| 5,028,500 | 7/1991 | Fong et al. | 429/194 |
| 5,069,683 | 12/1991 | Fong et al. | 29/623.1 |
| 5,344,724 | 9/1994 | Ozaki et al. | 429/94 |
| 5,344,726 | 9/1994 | Tanaka et al. | 429/209 |
| 5,385,777 | 1/1995 | Higuchi et al. | 428/316.6 |
| 5,387,479 | 2/1995 | Koksbang | 429/126 |
| 5,426,006 | 6/1995 | Delnick et al. | 429/218 |
| 5,427,872 | 6/1995 | Shen et al. | 429/142 |
| 5,436,092 | 7/1995 | Ohtsuka et al. | 429/194 |
| 5,436,093 | 7/1995 | Huang et al. | 429/217 |
| 5,443,601 | 8/1995 | Doeff et al. | 29/623.5 |
| 5,443,928 | 8/1995 | Takeuchi et al. | 429/218 |
| 5,451,477 | 9/1995 | Omaru et al. | 429/218 |
| 5,478,672 | 12/1995 | Mitate | 429/194 |
| 5,478,673 | 12/1995 | Funatsu | 429/197 |
| 5,482,797 | 1/1996 | Yamada et al. | 429/218 |
| 5,888,663 | 3/1999 | Frazier et al. | 429/10 |

OTHER PUBLICATIONS

P.K. Sharma and G.S. Hickey, "Kintetics of the Formation of Intercalation Compounds in Crystalline Graphite" presented at the 6th International Symposium on Chemically Modified Surfaces, San Jose, Calif., Jun. 19–21, 1995.

N. Takami, A. Satoh, M. Hara and T. Ohsaki, "Structural and Kinetic Characterization of Lithium Intercalation into Carbon Anodes for Secondary Lithium Batteries" *JES*, vol. 142 (1995) p. 371, no month available.

M.C. Robert, M. Oberlin and J. Mering, "Lamellar Reactions in Graphitizable Carbons" in Chemistry and Physics of Carbon, vol. 10 (editors P.L. Walker and P.A. Thrower) Marcel Dekker, New York (1973), p. 141, no month available.

*Primary Examiner*—Maria Nuzzolillo
*Assistant Examiner*—Monique Wills

[57] ABSTRACT

The battery contains at least one electrode such as graphite that intercalates a first species from the electrolyte disposed in a first compartment such as bromine to form a thermally decomposable complex during discharge. The other electrode can also be graphite which supplies another species such as lithium to the electrolyte in a second electrode compartment. The thermally decomposable complex is stable at room temperature but decomposes at elevated temperatures such as 50° C. to 150° C. The electrode compartments are separated by a selective ion permeable membrane that is impermeable to the first species. Charging is effected by selectively heating the first electrode.

19 Claims, 3 Drawing Sheets

THERMALLY REGENERATIVE BATTERY WITH INTERCALATABLE ELECTRODES AND SELECTIVE HEATING MEANS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to a regenerative battery having intercalatable electrodes and, more particularly, this invention relates to a thermally or electrically regenerative battery containing electrode compartments separated by an ion selective membrane, each of the compartments containing a graphite electrode.

BACKGROUND OF THE INVENTION

The premium on weight of a spacecraft limits the amount of fuel that can be carried into space. The success of any space mission depends on providing adequate power for the functioning of the spacecraft. Most spacecraft rely on solar panels to provide power. However, solar panels are idle during night periods. Fuel cells regenerated by solar cells can provide power during the night periods but are limited by the low efficiency of solar cells.

Waste heat or solar generated heat is also available on a spacecraft. The heat can be converted to electricity. Conventionally heat from Radioactive Thermal Generators, (RTG) is fed to thermocouples or thermionic devices to produce electrical power. However, these conversion methods are very inefficient because devices only provide a single stage of electrical generation in the millivolt range and are limited in conversion efficiency.

| List of References | |
|---|---|
| Patent No. | Patentee |
| H1076 | SLANE, et al. |
| 4,294,898 | HARSTEIN |
| 4,707,423 | KALNIN, et al. |
| 4,861,690 | OPE, et al. |
| 4,863,818 | YOSHIMOTO, et al. |
| 5,028,500 | FONG, et al. |
| 5,069,683 | FONG, et al. |
| 5,344,724 | OZAKI, et al. |
| 5,344,726 | TANAKA, et al. |
| 5,385,777 | HIGUCHI, et al. |
| 5,387,479 | KOKSBANG |
| 5,426,006 | DELNICK, et al. |
| 5,427,872 | SHEN, et al. |
| 5,436,092 | OHTSUKA, et al. |
| 5,436,093 | HUANG, et al. |
| 5,443,601 | DOEFF, et al. |
| 5,443,928 | TAKEUCHI, et al. |
| 5,451,477 | OMARU, et al. |
| 5,478,672 | MITATE |
| 5,478,673 | FUNATSU |
| 5,482,797 | YAMADA, et al. |

STATEMENT OF THE PRIOR ART

Kalnin et al. disclose simultaneous intercalation at the cathode and the anode from an electrolyte with positive and negative ions, respectively. In the process of the invention, $Br_2$ intercalates into the cathode from the electrolyte to yield $Br^-$ ions whereas $Li^+$ comes out of the anode into the electrolyte.

In the invention, use is made of an ion exchange membrane to separate the anode and cathode compartments. The membrane is impermeable to bromine and hence to $Br_3^-$ ions. These differences make it clear that the battery of the invention works by a different mechanism than the battery disclosed by Kalnin et al. The non aqueous solvents disclosed by Kalnin et al. are different than those used in the invention.

In the present invention, the battery is regenerable by heat, making use of a unique behavior of bromine intercalated graphite where most of the bromine intercalation is reversed by heating the bromine intercalated graphite to about 120° C. Such heat may be obtained by solar means or by use of waste heat. This thermal regeneration of the battery greatly increases its potential uses and applications.

STATEMENT OF THE INVENTION

The present invention provides a more direct and more efficient way of utilizing heat to store electrical energy. The heat is directly converted at high efficiency into stored chemical energy according to the invention in a battery containing a thermally regenerable electrode. After discharge, the battery can be recharged by heating the thermally regenerable battery.

The invention provides a thermally regenerable battery which produces high energy efficiency. The battery contains at least one electrode that intercalates a first species from the electrolyte in the first electrode compartment to form a thermally decomposable complex during discharge while the other electrode supplies another species to the electrolyte in the second electrode compartment. The thermally decomposable complex is stable at room temperature but is decomposable at an elevated temperature of 50° C. to 150° C., preferably 50° C. to 100° C., suitably 80° C. The electrode compartments are separated by a selective ion permeable membrane that is impermeable to the first species.

Charging can be effected either electrochemically or thermally. During thermal charging the first electrode is heated to a temperature sufficient to decompose the complex. The complex decomposes and the first electrode releases the first species into the electrolyte in the first compartment while the second species reacts with the second electrode to provide a recharged battery.

The thermally rechargeable battery of the invention can be utilized to provide high efficiency conversion of solar energy, Radioactive Thermal Generators (RTG) or other waste heat directly to chemical energy which can be stored for night time use. The stored chemical energy is directly convertible to electrical energy during night or day periods. The invention provides direct conversion of solar to electric energy, not limited by the efficiency of the solar cell which has an upper limit of only about 20 percent. Also the thermally rechargeable battery of the invention can be utilized to efficiently convert RTG heat or other heat to provide several watts of electricity rather than milliwatts at low efficiency as produced by thermocouples or thermionic generators.

A battery according to the invention can be used to power electrical apparatus in space or on earth as long as the power needs of the apparatus are consistent with the specific energy or energy density of the thermally rechargeable battery.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
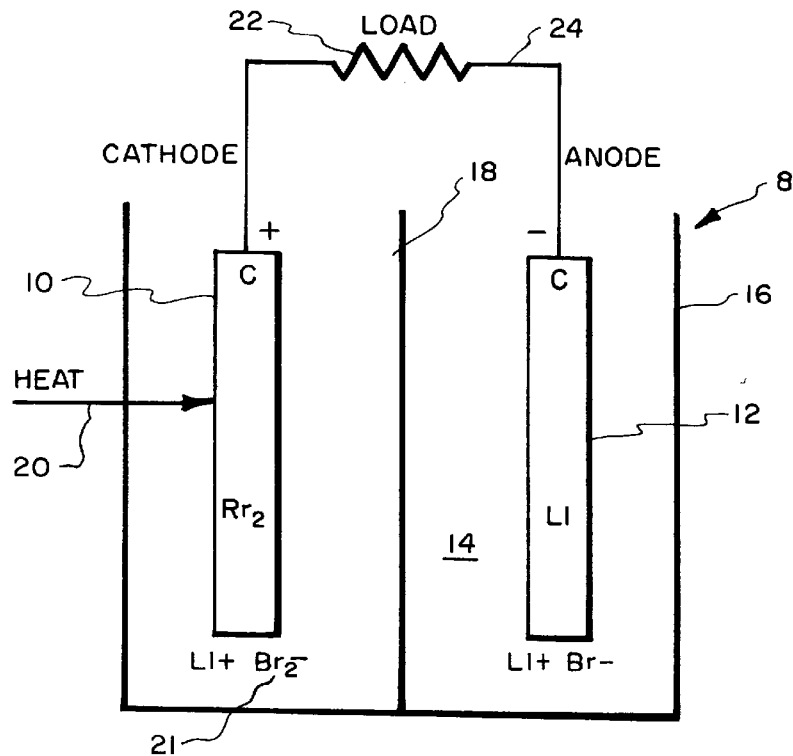
FIG. 1 is a schematic view of a thermally rechargeable battery in accordance with the invention.

The thermally rechargeable battery 8 of the invention as shown in FIG. 1 includes a positive, thermally rechargeable cathode 10 and a negative anode 12 immersed in a common body of electrolyte 14 contained within a housing 16. The cathode 10 and anode 12 are separated by a membrane 18 which is impermeable to the ion species 21 generated on heating the cathode by means of a heater 20.

When a load 22 is placed in the circuit 24 connecting the electrodes 10, 12 electric current will flow. The ion species 21 will be absorbed by the cathode 10. The battery 8 is regenerated by activating heater 20 to selectively heat the cathode 10 to a temperature to desorb the ion species 21.

Figure 2:
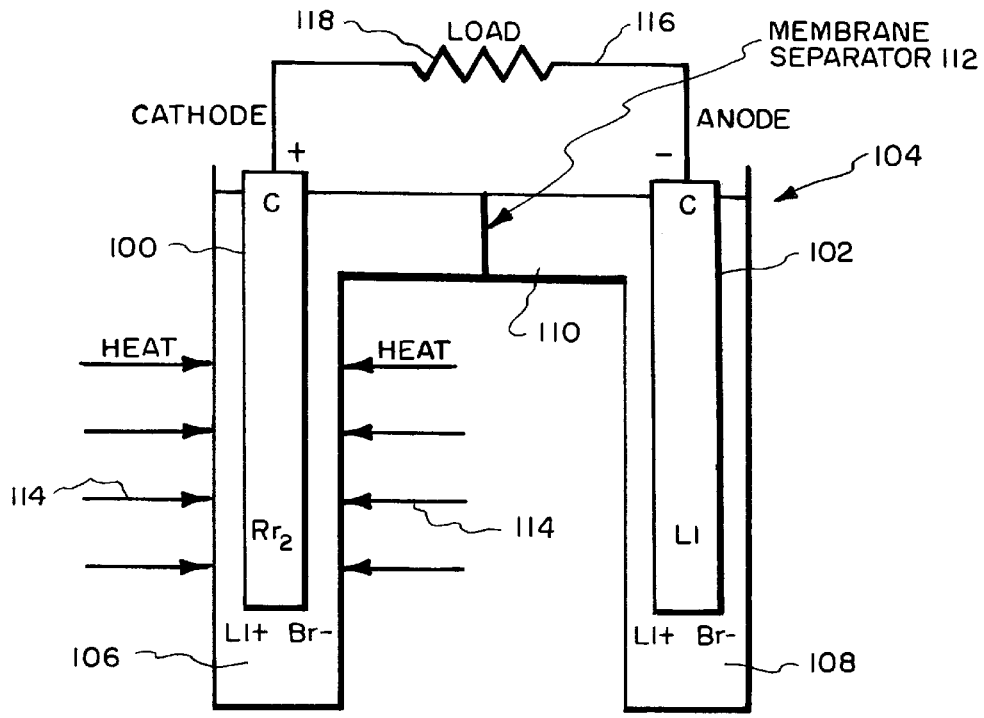
FIG. 2 is a schematic view of another configuration for the thermally rechargeable battery of the invention.

Since only the cathode need be heated, the cell configuration illustrated in FIG. 2 thermally isolates the cathode 100 from the anode 102. The cell 104 has cell compartments 106, 108 which are physically separated from each other but are joined by a bridge member 110 which contains a membrane separator 112. When a heat source 114 such as a resistance heating coil is selectively applied to the cathode compartment 106, while the electrodes 100, 102 are connected by a circuit 116 containing a load 118, $Br_3^-$ will be desorbed from the cathode 100 while $Li^+$ is intercalated into the graphite anode 102.

The cathode is preferably a solid with evenly spaced layers allowing the thermally regenerable species to intercalate between the layers forming a weak bond with the cathode material. Graphite is known to form intercalation complexes with halogens such as bromine and alkali metals such as potassium, cesium or lithium. The guest species enter the spacing between uniform layers of graphite atoms to form weak compounds at room temperature. The intercalation of halogens leads to a positive charge on graphite while the halogen ions are negatively charged. Similarly, the intercalation of alkali metals leads to a negative charge on graphite.

Figure 3:
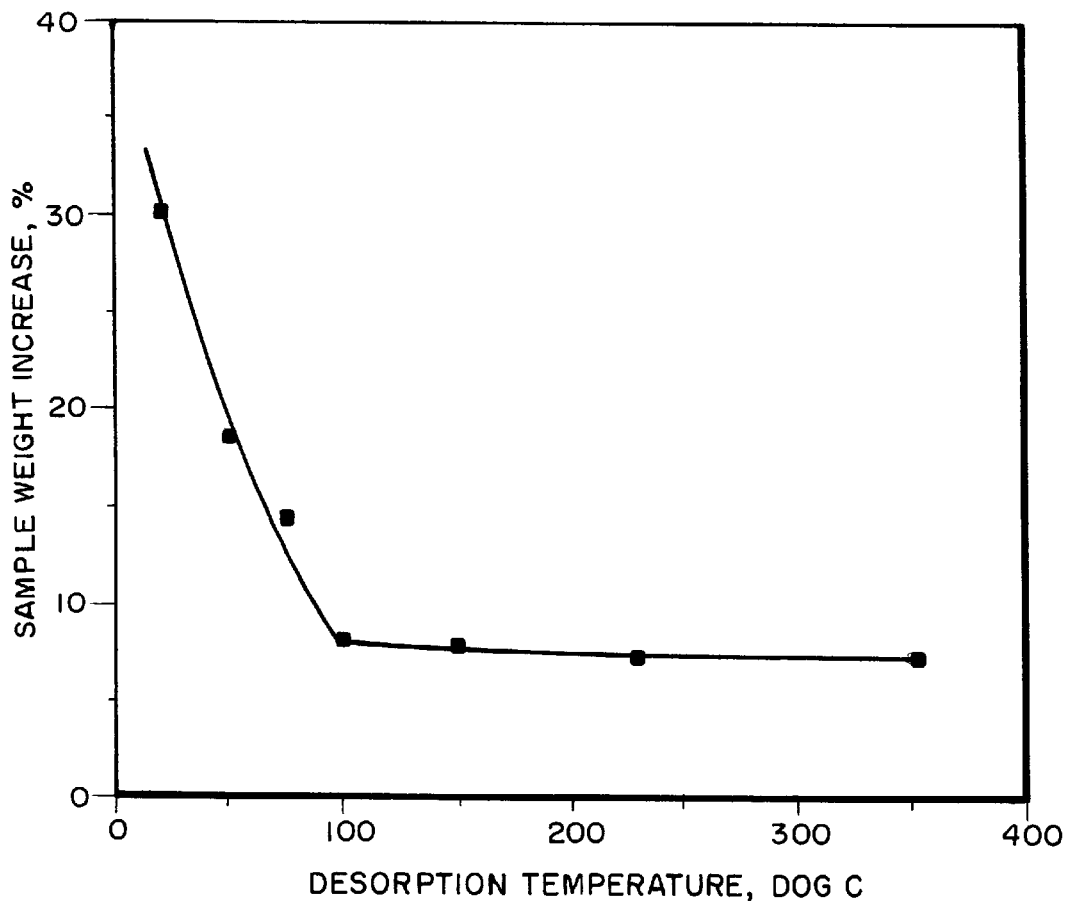
FIG. 3 is a graph showing weight change of the bromine intercalated sample as a function of desorption temperature.

The desorption of bromine from a graphite intercalated with about 35 percent by weight of bromine is shown in FIG. 3. At a temperature of about 120° C., essentially all bromine is desorbed from the graphite.

The electrolyte contains a solvent for dissolving the guest species and the ions emanating from the anode during discharge. The solvent can be aqueous or non-aqueous.

Suitable redox couples for anodes in an aqueous electrolyte are $Zn/Zn^{++}$, $Zn/Zno$, $Cd/Cd(OH)_2$ and $Fe/FeOOH$. The redox couples are shown below:

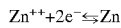

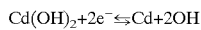

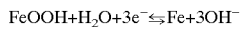

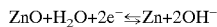

The preferred anode is graphite which is intercalated with lithium. This requires use of a polar non-aqueous solvent such as dimethyl carbonate, diethyl carbonate, dioxane, propylene carbonate, ethylene carbonate and mixtures thereof.

Intercalation of graphite with lithium in non-aqueous media is illustrated below:

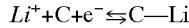

A salt of lithium is present in the electrolyte in an amount from 1% by weight up to saturation. Usually the salt is a salt of the intercalated species such as LiBr in the case of bromine. The ion exchange membrane is impermeable to bromine and $Br_3^-$ ions. Membrane material should be capable of rejecting $Br_3^-$ (anion—rejecting membrane). A class of such anion-rejecting membranes are sulfonic acid cation—exchange membranes such as:

I. NAFION$^R$ (DuPont product)

Perfluoro tetraethyl perfluoro alkoxysulfonic acid

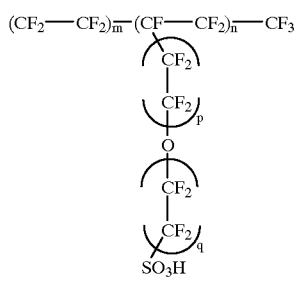

II. Polyhydrocarbon sulfonic acid

Dais corporation membranes

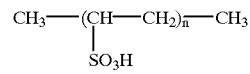

III. Poly aryloxy Ketone sulfonic acid Victrex®
Sulfonated polymer PEEK (poly ether ether ketone)
(ICI Product)

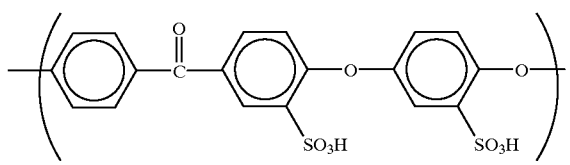

IV. Polyaryl ether sulfone sulfonic acid

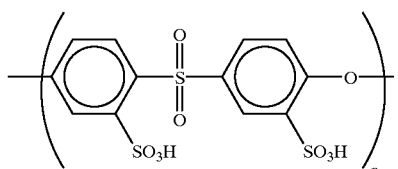

sulfonated—Victrex® or UDEL® (Union-Carbide)

A test cell was designed as follows:

An aqueous solution of approximately 0.50 molar potassium sulfate ($K_2SO_4$) was prepared by dissolving 21.2 g of $K_2SO_4$ in 300 ml of distilled water. This solution served as the electrolyte in the battery.

Bromine intercalated graphite paper was utilized as the cathode. Bromine intercalated graphite is a highly reactive material. Pieces of graphite paper were intercalated with bromine by contacting them with saturated bromine vapor at room temperature inside a glass flask for a period in excess of 3 days. The bromine intercalated paper was then taken out and its top end was wrapped in a platinum foil. The platinum foil was pre-attached to an electrical cable. Another platinum wire was used to serve as the anode in the cell. The reference electrode used was a saturated Calomel electrode with a potential of 0.24 volts vs. NHE (Normal Hydrogen Electrode).

Tests were carried out for comparison purposes on $Br_2$ intercalated graphite electrode and a blank graphite electrode. In the first configuration, the cathode was the $Br_2$-intercalated graphite paper and the anode was a platinum wire. The electrolyte was the 0.50 molar $K_2SO_4$ solution. In the second configuration, the cathode was a blank graphite paper and the anode was the same platinum wire. The electrolyte was also the same.

Figure 4:
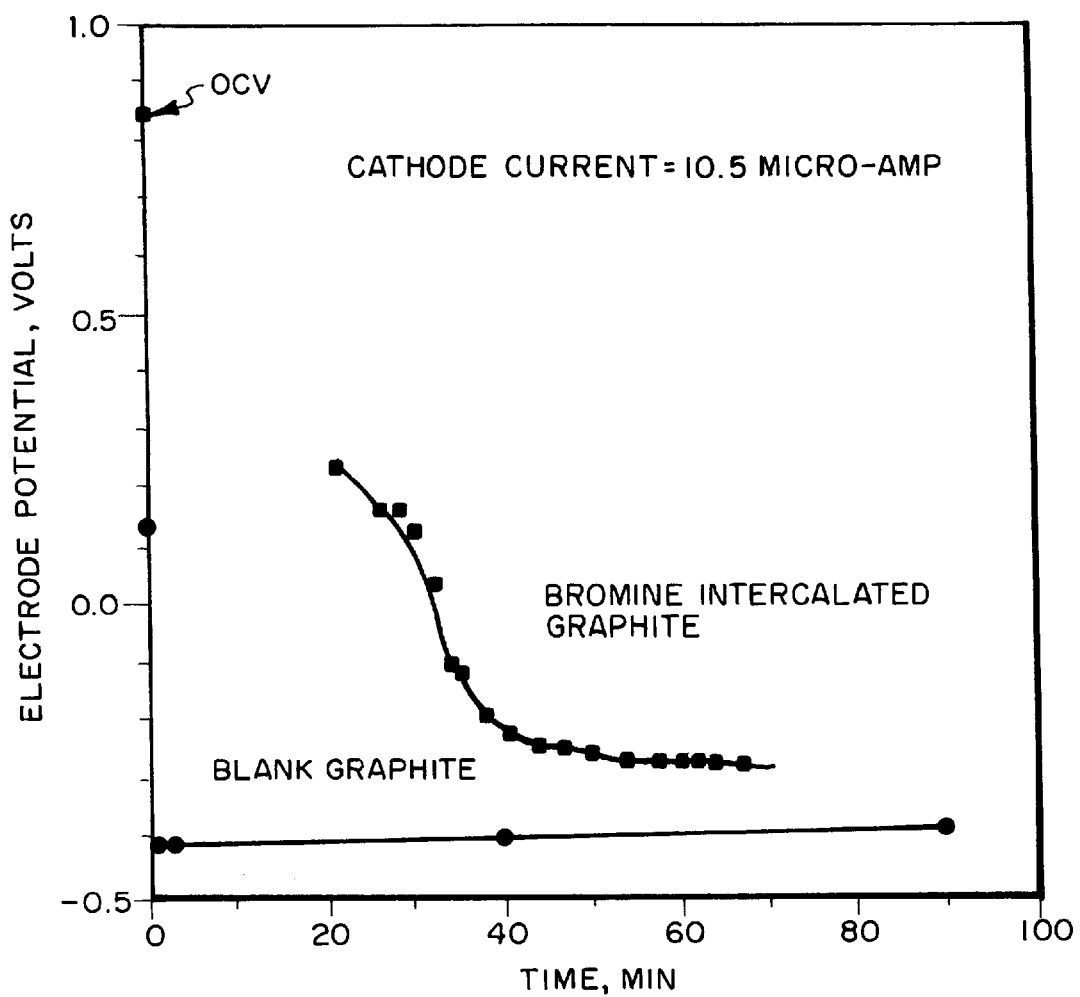
FIG. 4 is a graph of electrode potential versus time.

In the test with the first configuration with the $Br_2$-intercalated graphite, the open circuit voltage was first measured and was found to be 0.834 volts. This value is close to the $Br_2/Br^-$ standard reduction potential. The two electrodes were then connected and the $Br_2$ electrode was cathodically polarized with a current of about 10.5 micro-amps using an external power supply. About 20 minutes lapsed in connecting the electrodes and adjusting for the proper current. The electrode potential of the $Br_2$-graphite electrode was monitored as a function of time and the current was maintained at 10.5 micro-amps. The electrode potential vs. time profile obtained is shown in FIG. 4. The total test duration was about an hour. However, the test was interrupted three times to measure the open circuit voltage, which was found to be close to 0.80 volts.

In the test with the second configuration with the blank graphite, the open circuit voltage was first measured and was found to be 0.132 volts. A cathodic current of about 10.5 micro-amps was then made to flow through the cell using the external power supply. The electrode potential as a function of time was monitored again as before. The measurements are shown in FIG. 4. It is seen that the electrode potential remains at −0.400 volts, and is relatively independent of time. This voltage is basically determined by the $H_2$ evolution reaction in the distilled water solution at a pH of 5.0. This is the only reaction that can take place in the absence of bromine.

In test configuration 1, the expected reaction is:

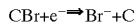
$$CBr+e^- \rightarrow Br^-+C$$

From FIG. 4, the observed open circuit voltage and the electrode potential decay with time are in agreement with the progress of above reaction. These results show that the above reaction can be sustained electrochemically. Thus, chemically intercalated $Br_2$ can be de-intercalated electrochemically. The capacity of the $Br_2$ electrode could be dependent on the type of graphite used and can be higher, depending on operating conditions.

In the absence of $Br_2$ in graphite (test configuration II), the reduction reaction sustained is $H_2$ evolution. The observed electrode potential, which is relatively constant, is in agreement with this reaction.

The remaining reaction to complete the cycle: [$Br^- \rightarrow \frac{1}{2}Br_2 + e^-$] is a well studied electrochemical process and its demonstration is not repeated here. Note: For regeneration, only the cathode is heated.

The important parameters to evaluate the practical aspects of such a battery are the voltage obtained and the energy density.

For the bromine cathode, the voltage $E_c$ is likely to be close to the standard reduction potential of bromine/Br- couple which is 1.08 volts. For the lithium anode, the voltage $E_a$ is close to −3.0 volts. Therefore, the cell voltage, $E_c - E_a$ is approaching $$E_c - E_a = 1.08 - (-3.0) = 4.08 \text{ volts}.$$

Specific Energy Calculation:

For carbon-lithium anode, the stoichiometry is $C_6Li$ and the specific capacity obtained using Faraday's Law is 372 mAh/g.

For carbon-bromine cathode, preliminary intercalation measurements made with bromine vapor at room temperature indicate a stoichiometry of $C_{32}Br$ and a resultant specific capacity of 69 mAh/g of carbon. As this is the smaller number, the cathode energy density will be controlling and, hence, the battery specific capacity will be limited to 69 mAh/g of carbon. Even limited by the bromine electrode, the specific energy (amp-hours×volts) comes to be 280 mWh/g of carbon. It should be noted that when bromine intercalation is carried out at a higher vapor pressure, the cathode specific capacity (and hence specific energy) can be increased by a factor of 2 or more.

Potential Uses:

This invention has the potential to provide a direct high efficiency conversion of solar energy, RTG heat, or other waste heat to chemical energy storage which is directly convertible to electrical energy during night (or day) periods. Thus, the conversion of solar to electrical energy storage is not limited by the efficiency of the solar cell which has an upper limit of only about 20 percent. Also, the conventional approach of converting the RTG heat into electricity using thermocouples or thermoionic devices is rather inefficient because such devices have a single stage electrical generation in the millivolt range and are limited in conversion efficiency. The present concept, on the other hand, can provide about 4 volts at high efficiencies.

A battery of this type may find several applications for use in space. The applications must be consistent with the specific energy or energy density.

It is to be realized that only preferred embodiments of the invention have been described and that numerous substitutions, modifications and alterations are permissible without departing from the spirit and scope of the invention as defined in the following claims.

We claim:

1. A regenerable battery comprising in combination:
    a cell containing an electrolyte;
    a first compartment in the cell containing a first electrode immersed in said electrolyte, said first electrode capable of intercalating a first species and desorbing the first species when heat is applied to the first electrode;
    means for selectively heating the first electrode;
    a second compartment containing a second counter electrode immersed in said electrolyte; and
    a membrane disposed in said cell separating the first compartment from the second compartment which is impermeable to the compound formed on desorbing said first species.

2. A battery according to claim 1 which the first electrode comprises graphite.

3. A battery according to claim 2 in which the first species is a halogen.

4. A battery according to claim 3 in which the first species is bromine.

5. A battery according to claim 4 in which said second counter electrode is capable of supplying a second species to said electrolyte during intercalation of said first species, said second species is a metal selected from the group consisting of metals from Groups I, II and III of the Periodic Table.

6. A battery according to claim 5 in which the solvent is non-aqueous.

7. A battery according to claim 6 in which the second electrode comprises graphite and the second species is intercalatable into graphite during charging of said cell.

8. A battery according to claim 7 in which the second species is an alkali metal.

9. A battery according to claim 8 in which the second species is lithium.

10. A battery according to claim 9 in which the electrolyte contains $Li^+Br^-$.

11. A battery according to claim 10 in which the membrane is impermeable to $Br_3^-$.

12. A battery according to claim 1 in which the heating means is thermally connected only to the first compartment.

13. A regenerable battery comprising in combination:
   a cell containing a non-aqueous electrolyte containing $Li^+Br^-$;
   a first compartment in the cell containing a first electrode comprising graphite immersed in said electrolyte, said first electrode capable of intercalating a first bromine species and desorbing the first species when heat is selectively applied to the first electrode;
   a second compartment containing a second graphite counter electrode immersed in said electrolyte, lithium second species being intercalatable into the graphite counter electrode during charging the battery; and
   a membrane disposed in said cell separating the first compartment from the second compartment which is impermeable to $Br^-3$ and to the compound formed on desorbing said first species.

14. A battery according to claim 13 in which the membrane comprises a sulfonic acid polymeric ion exchange material capable of rejecting $Br_3^-$.

15. A battery according to claim 14 in which the membrane is selected from the group consisting of perfluorotetraethyl perfluoroalkoxysulfonic acid, polyhydrocarbon sulfonic acid, poly aryloxysulfonic acid and polyarylsulfone sulfonic acid.

16. A battery according to claim 13 in which the electrolyte is aqueous.

17. A battery according to claim 16 in which the second species is selected from $Zn^{++}$, $Cd(OH)_2$, $FeOOH$ and $ZnO$.

18. A regenerable battery comprising in combination:
   a cell containing an electrolyte;
   a first compartment in the cell containing a first electrode immersed in said electrolyte, said first electrode capable of intercalating a first species and desorbing the first species when heat is applied to the first electrode;
   heating means for heating the first compartment to a temperature sufficient to desorb the first species;
   a second compartment containing a second counter electrode immersed in said electrolyte, said second compartment being spatially separated from said first compartment; and
   a membrane disposed in said cell separating the first compartment from the second compartment which is impermeable to the compound formed on desorbing said first species.

19. A method of regenerating a battery comprising the steps of:
   immersing a first thermally regenerable graphite electrode containing an intercalated bromine species capable of being thermally desorbed in an electrolyte containing lithium bromide in a first compartment;
   immersing a graphite counter electrode in electrolyte in a second compartment, a lithium species being intercalatable into the graphite counter electrode during charging the battery;
   separating the compartments by means of a sulfonic acid polymeric membrane impermeable to $Br^-_3$ ions capable of rejecting the thermally desorbed bromine species; and
   selectively heating the first electrode to a temperature at which the bromine species is desorbed.

\* \* \* \* \*